Aug. 17, 1965     W. SCHIEBELER     3,201,671
ROTOR CONTROLLED STEP MOTOR
Filed Oct. 17, 1961     2 Sheets-Sheet 1
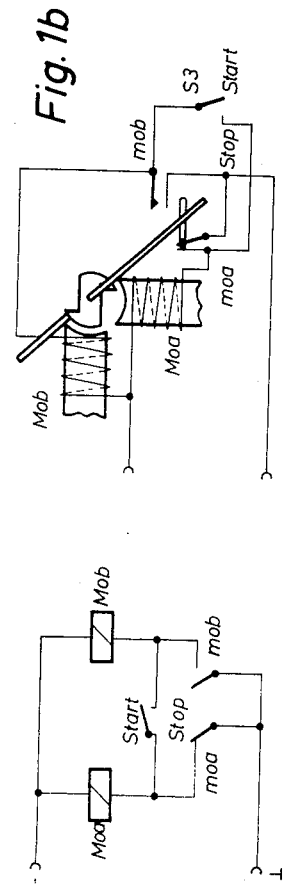
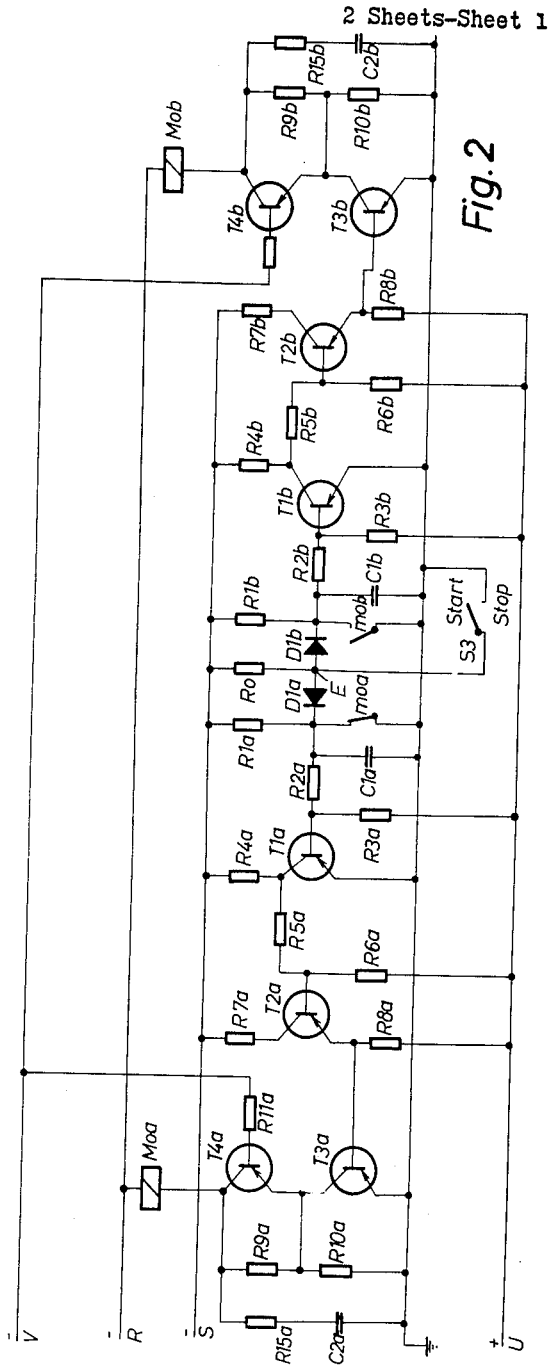
INVENTOR
WERNER SCHIEBELER

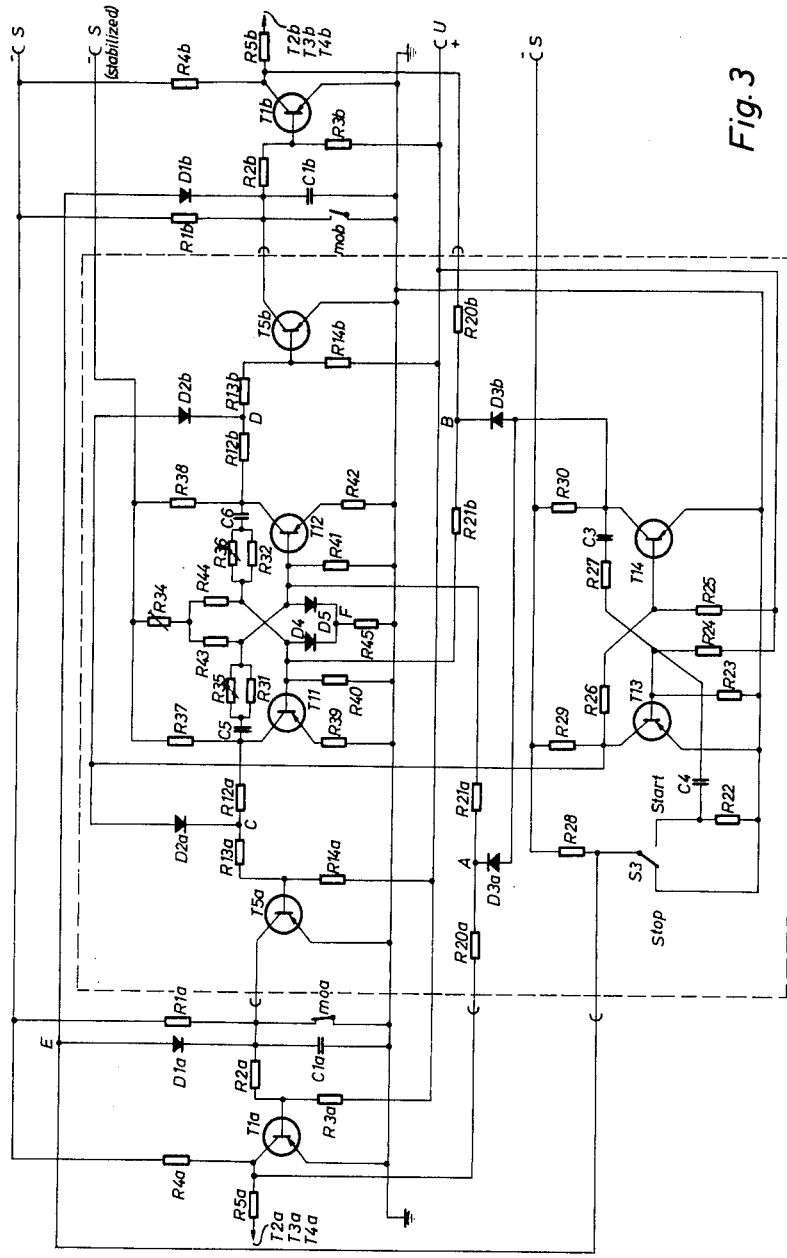

United States Patent Office 3,201,671
Patented Aug. 17, 1965

3,201,671
ROTOR CONTROLLED STEP MOTOR
Werner Schiebeler, Eutingen, Baden, Germany, assignor to International Standard Electric Corporation, New York, N.Y., a corporation of Delaware
Filed Oct. 17, 1961, Ser. No. 145,720
Claims priority, application Germany, Oct. 27, 1960,
St 17,052
3 Claims. (Cl. 318—138)

In the case of perforated tapes and reading devices operating at tape speeds of more than 20 combinations per second it is customary to use non-mechanical reading or scanning methods, for example, a photoelectric scanning method. In order that this photoelectric scanning, which can operate very rapidly because of being completely inertialess, can be utilized completely or almost completely, there are required tape drives which likewise operate with as little delay as possible, in other words, which are capable of accelerating the tape within a short time to the final velocity, which advance the tape at a high speed and are capable, above all, of stopping the tape very rapidly and exactly in order that there is caused no loss of information upon execution of a stop instruction.

For the employment with such tape drives it is suitable to use, among others, incremental or stepper servo motors of the type used in telephone switching systems for the driving of precious metal rotary selectors. These motors are D.C.-motors and are stepped at a stepping speed of about 180 to 220 steps per second and, when being braked magnetically, come to a standstill in the last occupied stepping position. When using such a stepper servo motor for advancing a perforated tape, each motor step feeds the perforated tape by respectively one hole combination. The synchronous advancement of the perforated tape in relation to the stepping rhythm of the motor is effected by a special type of toothed wheel, known as a beaded sprocket wheel which, with its teeth or beaded sprockets, engages the row of feed holes of the tape. Each step of the motor corresponds to a movement of the wheel by one sprocket.

If now, e.g. by the photoelectric reading device, there is read a hole combination, and if this hole combination causes the release of a stop signal for the stepper servo motor, the motor will remain in the last stepping position. Consequently, also the last read hole combination will remain in the reading zone.

First of all, and with reference to FIGS. 1a and 1b, therewith now be described the mode of operation of a conventional stepper servo motor arrangement. The motor consists of two motor magnets, of a rotatable armature with two noses or projections which are tapered in the running direction, of two contacts and of an interruptor disk fitted on the same shaft as the armature. This interruptor disk, however, is shown in FIG. 1 as a camplate. The free running of the motor is effected by the cooperation of the motor magnets $Mo_a$ and $Mo_b$, and and of the motor contacts $mo_a$ and $mo_b$. If the contact $mo_a$ is closed, then a current flows through the magnet coil $Mo_a$. The armature is attracted and performs one quarter of a rotation (one step). Now the contact $mo_a$ is opened, and the contact $mo_b$ is closed. Current now flows through the coil $Mo_b$, and the armature performs a further quarter of one rotation. This reciprocal action is repeated at a speed of 180 to 220 steps per second, corresponding to 50 rotations per second. The closing times of the contacts $mo_a$ and $mo_b$ slightly overlap each other thereby, which is essential for achieving a high number of rotations of the motor.

If the motor is now supposed to be stopped, then the switch S3 has to be reversed to the position "Stop". In this case the current flows through both of the motor magnet coils $Mo_a$ and $Mo_b$, and the armature is stopped in an intermediate position.

Stopping of the motor within a very short time, however, involves considerable difficulties, because there is required, for example, a mechanical contact for bridging the motor contacts. A mechanical contact, for example, one that is operated by a relay, is too slow to stop the motor in the desired position. For this reason it was up to now almost impossible to use a stepper servo motor for high-speed tape drive. The invention proposes that between each motor contact and the associated magnet coil there is inserted a transistor amplifier, by which the associated magnet coil is energized in the rhythm of the closing times of the motor contact.

It is one peculiarity of the stepper servo motor that the rate of rotation to a great extent depends on both the voltage and the load. In many cases it is no obstacle if the tape speed, for example, varies between 180 and 220 hole combinations per second. However, there are some cases of practical application where the perforated tape has to be advanced at a very uniform velocity. In certain cases of practical application the tape must even be driven in the proper phase and frequency relation to a timing or clock signal.

Objects of the present invention are as follows:

In order to make the speed of the stepper servo motor independent of both the load and the voltage, and in order to control the speed within certain limits, and also to establish a frequency-phase relation to a clock signal it is proposed, in accordance with a further embodiment of the invention, to arrange a switching transistor $T5_a$ in parallel relation to the contact $mo_a$, to arrange a switching transistor $T5_b$ in parallel relation to the contact $mo_b$, and to control the two switching transistors alternately by a multivibrator T11–T12 which is controllable with respect to its frequency, in such a way that the transistor opening times, at a rated speed of the motor, coincide with the closing times of the contacts, i.e. take a lead (or advance) at a desired increase of the speed, and have a lag in the case of a desired reduction of speed.

Other objects of this invention will become apparent from a consideration of the following detailed specification taken in conjunction with the accompanying drawings, in which:

FIGURE 1A is a block diagram of a stepper servo-motor arrangement;

FIGURE 1B is a diagram of a stepper servo-motor arrangement showing structure of the motor;

FIG. 2 shows a circuit arrangement for electronically controlling a stepper servo motor; and FIG. 3 is a further embodiment of the circuit arrangement shown in FIG. 2.

The circuit arrangement according to FIG. 2 consists of two transistor amplifier $T1_a$, $T2_a$, $T3_a$, $T4_a$, and $T1_b$, $T2_b$, $T3_b$, $T4_b$ which are both of the same type.

In the course of the further explanations reference is only made to the transistor amplifier shown on the left and provided with the indices $a$, because it has the same mode of operation as the transistor amplifier shown on the right, and whose circuit elements are designated by the indices $b$.

The base electrode of transistor $T1_a$, via the biasing network $R1_a$, $R2_a$, $R3_a$ which is coupled via $R1_a$ to a negative potential S of e.g. $-12$ volts, and via $R3_a$ to a positive potential U, e.g. of $+6$ volts, is negatively biased when the contact $mo_a$ is open. Accordingly, the transistor $T1_a$ is unblocked. Upon closing contact $mo_a$ the base electrode of the transistor $T1_a$ becomes positive, so that this transistor is cut off. On account of this there is effected an unblocking of transistor $T2_a$ whose base electrode is negatively biased by the voltage divider $R4_a$, $R5_a$, $R6_a$ which is only effective when the transistor $T1_a$ is blocked. The unblocking of the transistor $T2_a$ now effects that the base electrode of transistor $T3_a$ becomes negative, because the resistance of $R8_a$ is substantially higher than the resistance of $R7_a$. Since thereby the emitter potential of the transistor $T4_a$, which hitherto had been held strongly negative via the resistors $R9_a$ and $R10_a$, is thus grounded, the transistor $T4_a$ is capable of unblocking, so that a potential, e.g. of −40 volts, will no appear across the magnet coil $Mo_a$ which is applied to a special negative potential R. In the course of this the base electrode of transistor $T4_a$ is negatively biased via the series resistance $R11_a$ which is applied to the potential V of about −55 volts.

Thus, the above-described circuit illustrates a number of advantageous aspects of the present invention associated with the use of transistor circuits; namely, the elimination of the application of high voltages to the stepper servo motor contacts and the controllable limitation of the amplitude of transient signals applied to the motor coils.

A standstill or stoppage of the motor is effected when the connecting point E of the diodes $D1_a$ and $D1_b$ is applied to 0 volt, that is, when it is connected to ground via S3. In this case both of the transistors $T1_a$ and $T1_b$ are blocked and, consequently, both of the motor coils $Mo_a$ and $Mo_b$ are traversed by current.

This switch S3 in FIG. 2 may now be easily replaced by a transistor which, unlike a relay, can be controlled in an inertialess manner. In this way the motor can be stopped with the desired accuracy. The switch S3 in FIG. 1, however, could not be replaced by a transistor, because the usual commercially available types of transistors do not permit the passage of current in both directions.

The external synchronization as well as the stabilization of the speed of a stepper servo motor will now be explained with reference to FIG. 3. In this explanation the circuit elements with corresponding functions which are shown on the left in the circuit arrangement are designated by the index $a$, and those which are shown on the right by the index $b$. In parallel relation to the motor contact $mo_a$ which, via the transistor amplifier $T1_a$ ... $T4_a$ as described with reference to FIG. 2, controls the current flow in the magnet coil $Mo_a$, there is arranged a switching transistor $T5_a$, and in parallel relation to the contact $mo_b$ there is arranged a switching transistor $T5_b$. A conventional type of multivibrator consisting of the transistors T11 and T12, alternately unblocks these switching transistors for the duration of its negative output pulses which are conducted via the resistors $R12_a$, $R13_a$ or $R12_b$, $R13_b$ respectively. The multivibrator oscillates freely with a frequency corresponding to about the sequence of steps of the motor. This frequency can be varied within certain limits by the potentiometer R34. In order to make the frequency also insensitive to line voltage variations, the operating voltage of the multivibrator is stabilized in a known manner. The influence of temperature variations upon the frequency of the multivibrator is eliminated by the thermistors R35 and R36 connected parallel in relation to the resistors R31 and R32.

An unblocked switching transistor $T5_a$ or $T5_b$ corresponds in its effect to a closed contact $mo_a$ or $mo_b$ respectively. Accordingly, there are two possibilities for influencing the speed of the motor by the frequency of the multivibrator.

If the natural frequency or natural number of revolutions of the motor is lower than that of the multivibrator, then the transistor $T5_a$ already becomes unblocked before the contact $mo_a$, which was open up to now, is closed again. Accordingly, the armature is attracted by the coil $Mo_a$ somewhat earlier, so that the motor speed increases.

If the natural frequency of the motor is higher than that of the multivibrator, then the transistor $T5_a$ remains to be unblocked somewhat longer than the contact $mo_a$ is closed. Accordingly, the armature is braked or retarded by $Mo_a$, so that the number of revolutions is reduced. The stepper servo motor follows the frequency variations of the multivibrator exactly with respect to its number of steps, within the range of about 150 to 250 steps per second. In addition thereto it is possible that in the course of this the load as well as the useful voltage of the motor can be varied, while the motor stepping rate remains unaffected.

The mode of operation of the electronic synchronizing and stabilizing arrangement can also be explained as follows:

Closing, opening and superposition times of the motor contacts $mo_a$ and $mo_b$ are not adjusted in the optimum way from the beginning. By the electronic connection, however, these operating times are either improved or deteriorated, quite depending on whether the motor speed is too low or too high. Accordingly, in this way the number of steps of the motor can be made to correspond to the frequency of the multivibrator. A stabilization of the number of steps per second may now be effected by way of stabilizing the frequency of the multivibrator. This stabilization, however, can be carried out in a substantially simpler way. In cases where high accuracy is required it is suggested to provide a quartz crystal as the frequency standard, and in the case of smaller requirements it is sufficient to provide simple stabilizing arrangements for the operating voltage of the multivibrator.

If a perforated tape is to be driven by a stepper servo motor comprising the just described synchronizing circuit then, at the starting of the stepper servo motor, that is, when changing from stop to start, there exists a certain difficulty, because the motor starting without a synchronization requires about 9 ms. for the first step, and about 6 ms. for the second step, and only 5 ms. for all further steps. Accordingly, there is first of all required a speeding-up of the motor until the motor has reached its normal stepping speed. If the motor were to be synchronized by the multivibrator immediately after switching-on, the motor would start jerkily, that is, it would skip two or three steps. This, however, would be likely to cause any probably provided perforated-tape control arrangement to respond.

In order to eliminate these difficulties, there is provided, according to the showing of FIG. 3, a univibrator of the conventional type consisting of the transistors T13 and T14, which is adapted to reverse the synchronization of the motor effected by the multivibrator, during the starting of the motor in such a way that for the duration of e.g. three steps, the output pulses of the multivibrator are diverted to ground, so that the multivibrator is brought into a proper phase relation by the motor contacts $mo_a$ and $mo_b$.

In detail this is effected as follows: During the running of the motor at a rated speed the univibrator T13–T14 is in its normal position. The transistor T13 is blocked, and the transistor T14 is unblocked. The latter applies the points A and B to ground via diodes $D3_a$ and $D3_b$, so that the pulses coming from the transistors $T1_a$ and $T1_b$ are deviated and thus prevented from reaching the base electrodes of the transistors T11 and T12 of the multivibrator.

In contrast thereto the collector voltages of the transistors T11 and T12, via the resistors $R12_a$, $R13_a$ or $R12_b$, $R13_b$ respectively, control the subsequently following switching transistors $T5_a$ and $T5_b$ which are arranged in parallel relation to the contacts $mo_a$ and $mo_b$ of the stepper servo motor, and thus enforce the synchronism.

However, if the stepper servo motor, by reversing the switch S3, is switched to the position "start," then the ground connection is taken away from point E. On account of this the motor contacts $mo_a$ and $mo_b$ are electrically released. At the same time a negative pulse is applied via the capacitor C4, to the input to the univibrator, hence to the base electrode of transistor T13. The univibrator triggers in a way that the transistor T13 is unblocked, and the transistor T14 is blocked. In this way the control lead extending from the stepper servo motor to the multivibrator and to the points A and B is released, because these points are no longer connected to ground via the transistor T14. At the same time the points C and D are connected to ground via the diodes $D2_a$ and $D2_b$, and via the unblocked transistor T13.

For example, if the contact $mo_b$ is opened and, consequently, the transistor $T1_b$ is unblocked, and if the transistors $T2_b$, $T3_b$ and $T4_b$ are blocked, then the armature is attracted by the coil $Mo_a$, and the negative voltage at the collector electrode of the blocked transistor $T1_a$ is conducted via the resistors R21 and R20 to the base of transistor T12. This transistor is unblocked and, consequently, stops the previously freely oscillating multivibrator in the proper phase relation. The transistors $T5_a$ and $T5_b$ are both blocked, because the points C and D are grounded. On account of this there is effected no influencing of the motor control by the multivibrator. The multivibrator, however, is controlled in the proper phase relation by the opening and closing motor contacts $mo_b$ and $mo_a$.

The trigger time of the univibrator is so dimensioned that it will drop back to the normal position after three steps of the motor, namely after the motor has approximately reached the operating speed. On account of this the points A and B are again grounded via the diodes $D3_a$ and $D3_b$, and the compulsory control of the multivibrator is abandoned. The multivibrator may now oscillate freely at the rated frequency, and will take over from this time position onwards, the synchronization of the motor in the proper phase relation via $R12_a$, $R13_a$, $T5_a$ on one hand, and via $R12_b$, $R13_b$ and $T5_b$ on the other hand, because the points D and C are no longer grounded via the diodes $D2_a$ and $D2_b$.

By this initial reversal of the synchronization upon switching-on of the stepper servo motor the motor can be speeded up continuously, and is only compulsorily synchronized after three steps in the proper phase relation.

If the described reversal of the synchronization is impossible for some reason or other, e.g. because several stepper servo motors are supposed to be controlled in synchronism by a central or master clock, then another method has to be chosen. In this case the multivibrator T11, T12 is to be replaced by a symmetrically triggered flip-flop, for example, in that each of the capacitors C5 and C6 are bridged by a resistor of 40 kiloohms. Furthermore there could be omitted: the univibrator T13, T14, the diodes $D3_a$, $D3_b$, $D2_a$, $D2_b$, as well as the resistors $R20_a$, $R20_b$, $R21_a$ and $R21_b$, R34, R35, R36, R43, R44.

For starting the stepper servo motor it is necessary once to turn the switch S3 to the "start" position and, secondly, to trigger the new flip-flop T11–T12 backwards and forwards in the rhythm of the desired number of steps per second. This can be effected in that negative stepping pulses are applied to the point F of the diodes D4, D5, which pulses, in the case of 200 steps per second, must have time intervals of 5 ms. In order to ensure an unobjectionable starting of the stepper servo motor it is merely necessary to suppress the second stepping pulse electronically with the aid of a suitable, not particularly shown circuit arrangement. On account of this the first synchronized length of step of 5 ms. is extended to a duration of 10 ms. All further steps, however, again have a duration of 5 ms. In this way there is effected an extensive adaption to the stepping times of the motor as would be performed by the motor after being switched-on, in the case of a free run without any synchronism (first step 9 ms., second step 6 ms.). Experience has shown that when suppressing the second stepping pulse, the stepper servo motor starts without any disturbance.

In one example of embodiment of the invention the values or types have been chosen for the individual circuit elements, and may be taken from the accompanying table.

While I have described above the principles of my invention in connection with specific apparatus, it is to be clearly understood that this description is made only by way of example and not as a limitation to the scope of my invention as set forth in the objects thereof and in the accompanying claims.

*Table*

| | |
|---|---|
| R24, 25 | 180K |
| $R14_a$, $R14_b$, 43, 44 | 120K |
| R22, 27 | 100K |
| $R20_a$, $R20_b$, $21_a$, $21_b$ | 80K |
| R26 | 47K |
| $R2_a$, $R2_b$, $12_a$, $12_b$ | 39K |
| $R13_a$, $R13_b$ | 33K |
| $R4_a$, $R4_b$, $5_a$, $5_b$ | 27K |
| R40, 41 | 17–27K |
| $R20_a$, $R20_b$, $21_a$, $21_b$ | 22K |
| R23 | 18K |
| R0, $9_a$, $9_b$, $10_a$, $10_b$, R28, 29, 35, 36 | 10K |
| $R1_a$, $R1_b$, 31, R32, R37, R38 | 8.2K |
| $R6_a$, $R6_b$ | 6.8K |
| R30 | 4.7K |
| $R8_a$, $R8_b$, 45 | 1.8K |
| $R11_a$, $R11_b$ | 1.5K |
| R39, 42 | 1K |
| $R7_a$, $R7_b$ _____ohms__ | 270 |
| $R15_a$, $R15_b$ _____do____ | 47 |
| $C1_a$, $C1_b$ _____µf__ | 0.025 |
| $C2_a$, $C2_b$ _____µf__ | 1 |
| C3 _____µf__ | 0.25 |
| C5, C6 _____µf__ | 0.3 |
| $T1_a$ | OC–71 |
| $T2_a$, $T2_b$, $5_a$, $5_b$, 13, 14 | OC–76 |
| T11, 12 | OC–470 |
| $T3_a$, $T3_b$, $T4_a$, $T4_b$ | ZN–268 |
| $D1_a$, $D1_b$, $D2_a$, $D2_b$, $D3_a$, $D3_b$ | OA–81 |

What is claimed is:

1. A controllable and synchronizable perforated tape drive adapted for high speed operation, comprising: a stepper servo motor having a plurality of stator magnet coils characterized by different electrical phase relationships within said stator and each having a first and a second terminal, said respective first terminals of said coils being conductively coupled together, a plurality of corresponding electrical contacts individually associated with said coils and coupled to said respective second terminals thereof, and a rotor element adapted to cyclically actuate said electrical contacts in predetermined phase sequence during operation of said motor; a plurality of amplifiers individually coupled between said contacts and said associated coils for energizing said associated coils in rhythm with the closures of said contacts, and means coupled in common to the inputs of all of said amplifiers for causing a simultaneous actuation of all of said coils to bring said rotor element to a stand-still.

2. A controllable and synchronizable perforated tape drive for achieving high tape speeds, comprising: a stepper servo motor having associated magnet coils and contacts actuated by a motor driven camplate, an amplifier coupled between each said motor contact and said associated magnet coil for energizing said associated magnet coil in the rhythm of the closing times of the said motor contacts whereby the signals applied to said motor coils and said contacts are more effectively controlled, a switching element in shunt with each said motor contact, and means for alternately operating said switching elements at the rated speed of said motor so that the period of closure of said switching elements corresponds to the closing times of the said motor contacts at the said rated speed, and otherwise leads or lags the said closing times to provide an appropriate speed correction.

3. A controllable and synchronizable drive according to claim 2 including gating means for preventing operation of said alternately controlling means for a predetermined interval commencing with the starting of said stepper servo motor, thereby enabling said servo motor to operate from a rest condition to its normal operating speed without external synchronization.

References Cited by the Examiner
UNITED STATES PATENTS

| | | | |
|---|---|---|---|
| 2,631,264 | 3/53 | Thomas | 318—254 |
| 3,041,516 | 6/62 | Bailey | 310—49 X |
| 3,042,847 | 7/62 | Welch | 318—254 |
| 3,091,728 | 5/63 | Hogan et al. | 318—254 X |
| 3,117,268 | 1/64 | Madsen | 310—49 |

ORIS L. RADER, *Primary Examiner.*
JOHN F. COUCH, *Examiner.*